(12) United States Patent
Howard et al.

(10) Patent No.: US 8,356,972 B2
(45) Date of Patent: Jan. 22, 2013

(54) THERMALLY ACTIVATED SHUTDOWN SEALS FOR ROTATABLE SHAFTS

(75) Inventors: Bruce Howard, Monroeville, PA (US); Judith Hodgson, Irwin, PA (US); Nick Tallos, Narberth, PA (US); Glenn Quinty, Horsham, PA (US); David Janocko, Pittsburgh, PA (US); Charles Bice, Murrysville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 637 days.

(21) Appl. No.: 12/631,888

(22) Filed: Dec. 7, 2009
(Under 37 CFR 1.47)

(65) Prior Publication Data
US 2010/0150715 A1    Jun. 17, 2010

Related U.S. Application Data

(60) Provisional application No. 61/121,207, filed on Dec. 10, 2008.

(51) Int. Cl.
*F16J 15/00*    (2006.01)

(52) U.S. Cl. .......................................... 415/136; 415/230

(58) Field of Classification Search .................. 415/136, 415/174.1, 174.2, 229, 230, 231; 277/500, 277/510, 551, 561, 584
See application file for complete search history.

(56) References Cited

U.S. PATENT DOCUMENTS

| | | | |
|---|---|---|---|
| 2,807,483 A * | 9/1957 | Cornelius | ..................... 277/561 |
| 2,937,039 A | 5/1960 | Santapa | |
| 3,001,806 A | 9/1961 | Macks | |
| 3,093,380 A | 6/1963 | Macks | |
| 3,096,985 A | 7/1963 | Biheller | |
| 3,377,073 A | 4/1968 | Harney | |
| 3,439,924 A | 4/1969 | Ludewig et al. | |
| 3,522,948 A | 8/1970 | MacCrum | |
| 3,529,838 A | 9/1970 | Singleton | |
| 3,574,473 A | 4/1971 | Gaffal | |
| 3,582,093 A * | 6/1971 | Lucien | ........................ 277/434 |
| 3,632,117 A | 1/1972 | Villasor | |
| 3,685,839 A | 8/1972 | Frei | |
| 3,697,088 A | 10/1972 | Hummer | |
| 3,720,222 A | 3/1973 | Andrews et al. | |
| 4,105,040 A | 8/1978 | Chester | |
| 4,275,891 A | 6/1981 | Boes | |
| 4,296,934 A | 10/1981 | Atkin | |
| 4,331,337 A | 5/1982 | Cross et al. | |

(Continued)

FOREIGN PATENT DOCUMENTS

| | | |
|---|---|---|
| EP | 0 343 409 | 5/1989 |
| WO | WO 95/20731 A1 | 8/1995 |

(Continued)

*Primary Examiner* — Edward Look
*Assistant Examiner* — Christopher R Legendre

(57) ABSTRACT

A thermally actuated shutdown seal for a rotating shaft having a narrow annular fluid flow path surrounding the shaft. The seal surrounds the shaft with the annulus therebetween during normal operation and constricts against the shaft when the shaft slows or stops rotating. The annulus is maintained open during normal operation by a spacer interposed between opposing ends of a split ring. When the shaft stops rotating, the temperature of the annulus rises, which actuates removal of the spacer from the split ring constricting the split ring against the shaft blocking the annulus. The blocked annulus causes a pressure differential across the seal which urges a polymer seal ring, downstream of the split ring against the shaft which seals the annulus. In one embodiment, the spacer is formed of a meltable material. In a second embodiment, the spacer is removed from the split ring by a thermally responsive actuator.

21 Claims, 10 Drawing Sheets

U.S. PATENT DOCUMENTS

| | | |
|---|---|---|
| 4,375,291 A | 3/1983 | Padgett |
| 5,171,024 A | 12/1992 | Janocko |
| 5,445,394 A | 8/1995 | Dusserre-Telmon et al. |
| 5,568,929 A | 10/1996 | Yoshinaga |
| 5,971,400 A | 10/1999 | Turnquist et al. |
| 5,988,649 A | 11/1999 | Van Ryper et al. |
| 6,250,641 B1 | 6/2001 | Dinc et al. |
| 6,358,000 B1 | 3/2002 | Veronesi et al. |
| 6,371,488 B1 | 4/2002 | Szymborski et al. |
| 2007/0140877 A1 | 6/2007 | Sanville et al. |
| 2007/0172367 A1 | 7/2007 | Janocko |
| 2010/0150715 A1 * | 6/2010 | Howard et al. ............ 415/230 |

FOREIGN PATENT DOCUMENTS

| | | |
|---|---|---|
| WO | WO2007/047104 A1 | 4/2007 |
| WO | WO 2007/047104 A1 | 4/2007 |
| WO | WO 2010068615 A2 * | 6/2010 |

* cited by examiner

THERMALLY ACTIVATED SHUTDOWN SEALS FOR ROTATABLE SHAFTS

CROSS REFERENCE TO RELATED APPLICATION

This application claims priority to Provisional Application Ser. No. 61/121,207, filed Dec. 10, 2009.

BACKGROUND OF THE INVENTION

1. Field of the Invention

This invention pertains generally to rotary shaft seals and, more particularly, to a thermally actuated shutdown seal for a centrifugal liquid pump.

2. Description of the Related Art

In pressurized water nuclear power plants a reactor coolant system is used to transport heat from the reactor core to steam generators for the production of steam. The steam is then used to drive a turbine generator for the production of useful work. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example, 550° F. (288° C.) and 2,250 psia (155 bar). The pump basically includes three general sections from bottom to top; hydraulic, shaft seal and motor sections. The lower hydraulic section includes an impeller mounted on the lower end of the pump shaft which is operable within the pump casing to pump reactor coolant about the respective loop. The upper motor section includes a motor which is coupled to drive the pump shaft. The middle shaft seal section includes three tandem seal assemblies; lower primary (number 1 seal), middle secondary, and upper tertiary seal assemblies. The seal assemblies are located concentric to, and near the top end of, the pump shaft and their combined purpose is to provide for minimal reactor coolant leakage along the pump shaft to the containment atmosphere during normal operating conditions. Representative examples of pump shaft seal assemblies known in the prior art are described in U.S. Pat. Nos. 3,522,948; 3,529,838; 3,632,117; 3,720,222 and 4,275,891.

The pump shaft seal assemblies which mechanically seal the interface between the stationary pump pressure boundary and the rotating shaft, must be capable of containing the high system pressure (approximately 2,250 psi (155 bar)) without excessive leakage. The tandem arrangement of three seal assemblies is used to break down the pressure in stages. These three mechanical pump seal assemblies are controlled-leakage seals which in operation allow a minimal amount of controlled leakage at each stage while preventing excessive leakage of reactor coolant from the primary coolant system to respective seal leakoff ports.

The pump seal assemblies are normally maintained at temperatures well below those of the primary coolant system, either through injection of cool fluid at the seal assemblies or through the use of a heat exchanger which cools the primary fluid before it reaches the seal assemblies. Theorized failure of these systems may expose the seal assemblies to high temperatures which will likely cause the controlled leakage of the seal assemblies to increase dramatically. When the cause of the loss of all fuel cooling is due to losing all AC power, the seal leakoff has no means of returning to the coolant system without electricity to power the makeup pumps. Controlled leakage without the means of makeup could hypothetically lead to reactor coolant uncovering the reactor core and subsequent core damage.

Consequently, a need exists for an effective way to back up the standard seal assemblies in the event of a coincidental loss of all fuel cooling and loss of makeup pumping. Furthermore, preferably such a backup seal should be operable upon loss of power or other cause for the loss of makeup pumping capacity to substantially seal the shaft from leakage.

SUMMARY OF THE INVENTION

The foregoing objectives are achieved, in accordance with this invention, by a thermally actuated shutdown seal for a shaft of reduced speed or stopped rotating equipment such as pump, compressor or the like that is designed to restrict the normal leakage of coolant through a shaft seal. The shutdown seal of this invention is useful for sealing any equipment having a narrow flow annulus between its shaft and housing. The shutdown seal was designed for sealing a centrifugal pump such as a reactor coolant pump of a pressurized water nuclear reactor. FIG. 2 illustrates a Reactor Coolant Pump (RCP) of the type employed by Westinghouse Electric Company LLC, to circulate high temperature water at high pressures in the primary circuit of a pressurized water nuclear reactor.

The shutdown seal is characterized by a "split ring" that is designed (i) to surround the shaft with an annulus therebetween during normal operation and (ii) to constrict against the shaft when the shaft slows below a predetermined speed or stops rotating. The split ring has confronting ends that are maintained in spaced relationship by a spacer when the shaft is rotating during normal on-line operation. When the shaft slows or stops rotating and the temperature in the housing rises, the spacer is removed from the confronting ends of the split ring and the split ring constricts against the shaft as the confronting ends of the split ring approach each other, which blocks a substantial portion of the leakage of coolant through the flow annulus. In one embodiment, the spacer is formed of a meltable material. In a second embodiment, the spacer is pulled from the split ring by a passively actuated device.

Preferably, the shutdown seal also has a pliable polymer seal ring which is urged against the shaft by an increase in pressure in the housing when the split ring blocks the leakage of coolant through the annulus. In one further embodiment the roundness of the annulus of the ring is improved when the ring is restrained in the open position by thickening a radial portion of the ring's circumference approximately 180° from the split.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
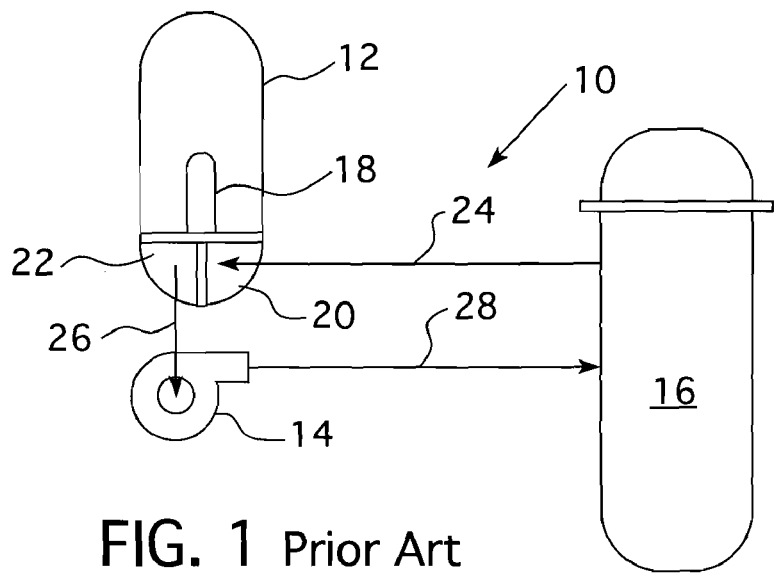
FIG. 1 is a schematic representation of one cooling loop of a conventional nuclear reactor coolant system which includes a steam generator and a reactor coolant pump connected in series in a closed-looped system with the reactor.

In the following description, like reference characters designate like or corresponding parts throughout the several views. Also, in the following description, it should be understood that such terms as "forward", "rearward", "left", "right", "upwardly", "downwardly", and the like, are words of convenience and are not to be construed as limiting terms.

Prior Art Reactor Coolant Pump

Referring to FIG. 1, there is shown a schematic representation of one of a plurality of coolant loops 10 of a conventional nuclear reactor coolant system. The coolant loop 10 includes a steam generator 12 and a reactor coolant pump 14 connected in series in a closed-loop coolant system with a nuclear reactor 16. The steam generator 12 includes primary heat exchange tubes 18 communicating with inlet and outlet plenums 20, 22 of the steam generator 12. The inlet plenum 20 of the steam generator 12 is connected in flow communication with the outlet of the reactor core 16 for receiving hot coolant therefrom along flow path 24, commonly referred to as the hot leg of the closed-loop system. The outlet plenum 22 of the steam generator 12 is connected in flow communication with an inlet suction side of the reactor coolant pump 14 along flow path 26 of the closed-loop system. The outlet pressure side of the reactor coolant pump 14 is connected in flow communication with the inlet of the reactor core 16 for feeding relatively cold coolant thereto along flow path 28 of the cold leg of the closed-loop system.

The coolant pump 14 pumps the coolant under high pressure about the closed-loop system. Particularly, hot coolant emanating from the reactor 16 is conducted to the inlet plenum 20 of the steam generator 12 and to the heat exchange tubes 18 in communication therewith. While in the heat exchange tubes 18, the hot coolant flows in heat exchange relationship with cool feedwater supplied to the steam generator 12 via conventional means (not shown). The feedwater is heated and portions thereof is changed to steam for use in driving a turbine generator (not shown). The coolant, whose temperature has been reduced by the heat exchange, is then recirculated to the reactor 16 via the coolant pump 14.

The reactor coolant pump 14 must be capable of moving large volumes of reactor coolant at high temperatures and pressures about the closed-loop system. Although, the temperature of the coolant flowing from the steam generator 12 through the pump 14 after heat exchange has been cooled substantially below the temperature of the coolant flowing to the steam generator 12 from the reactor 16 before heat exchange, its temperature is still relatively high, being typically about 550° F. (288° C.). To maintain the coolant in a liquid state at these relatively high temperatures, the system is pressurized by injection pumps (not shown) and operate at pressures that are approximately 2,250 psia (155 bar).

Figure 2:
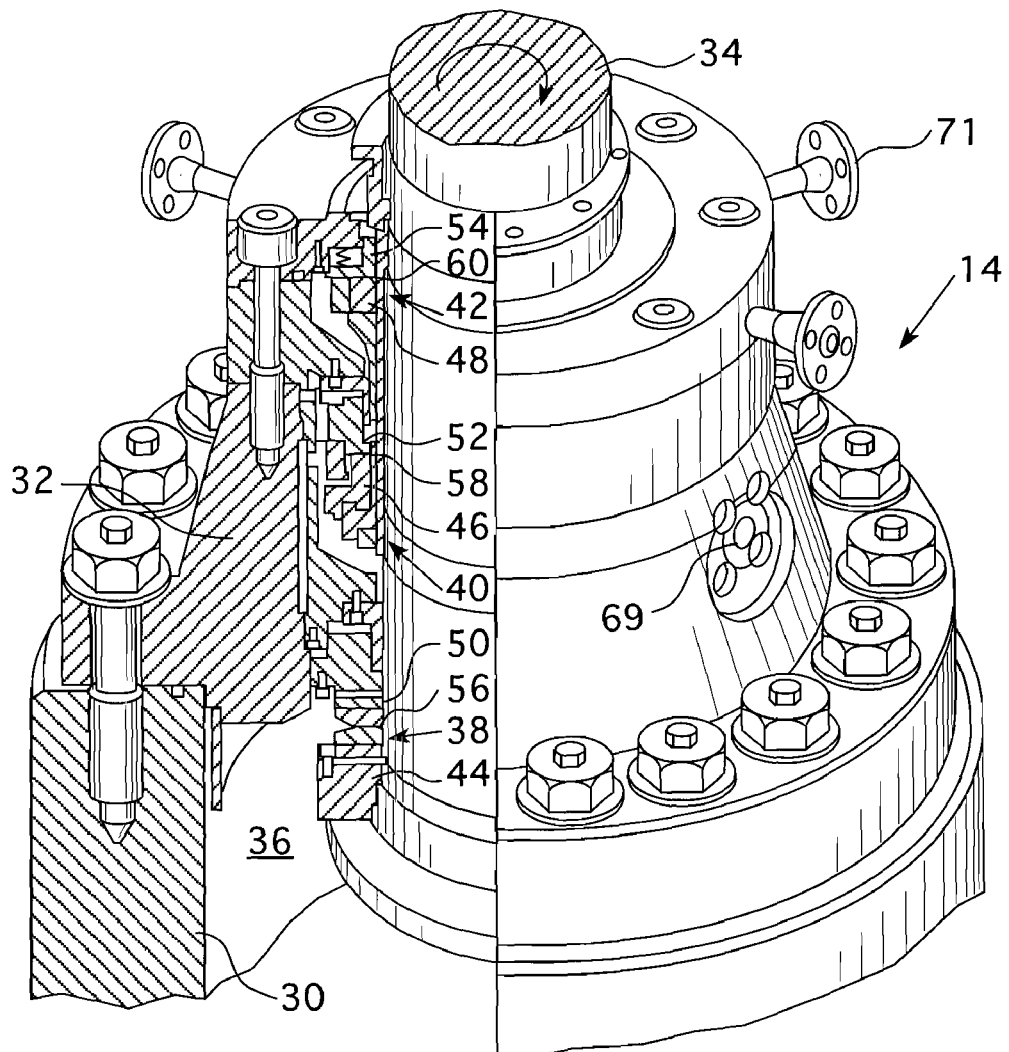
FIG. 2 is a cut away perspective view of the shaft seal section of a reactor coolant pump, illustrating in cross section the seal housing and the lower primary, middle secondary, and upper tertiary seal assemblies, which are disposed within the seal housing and surround the pump shaft.
Figure 3:
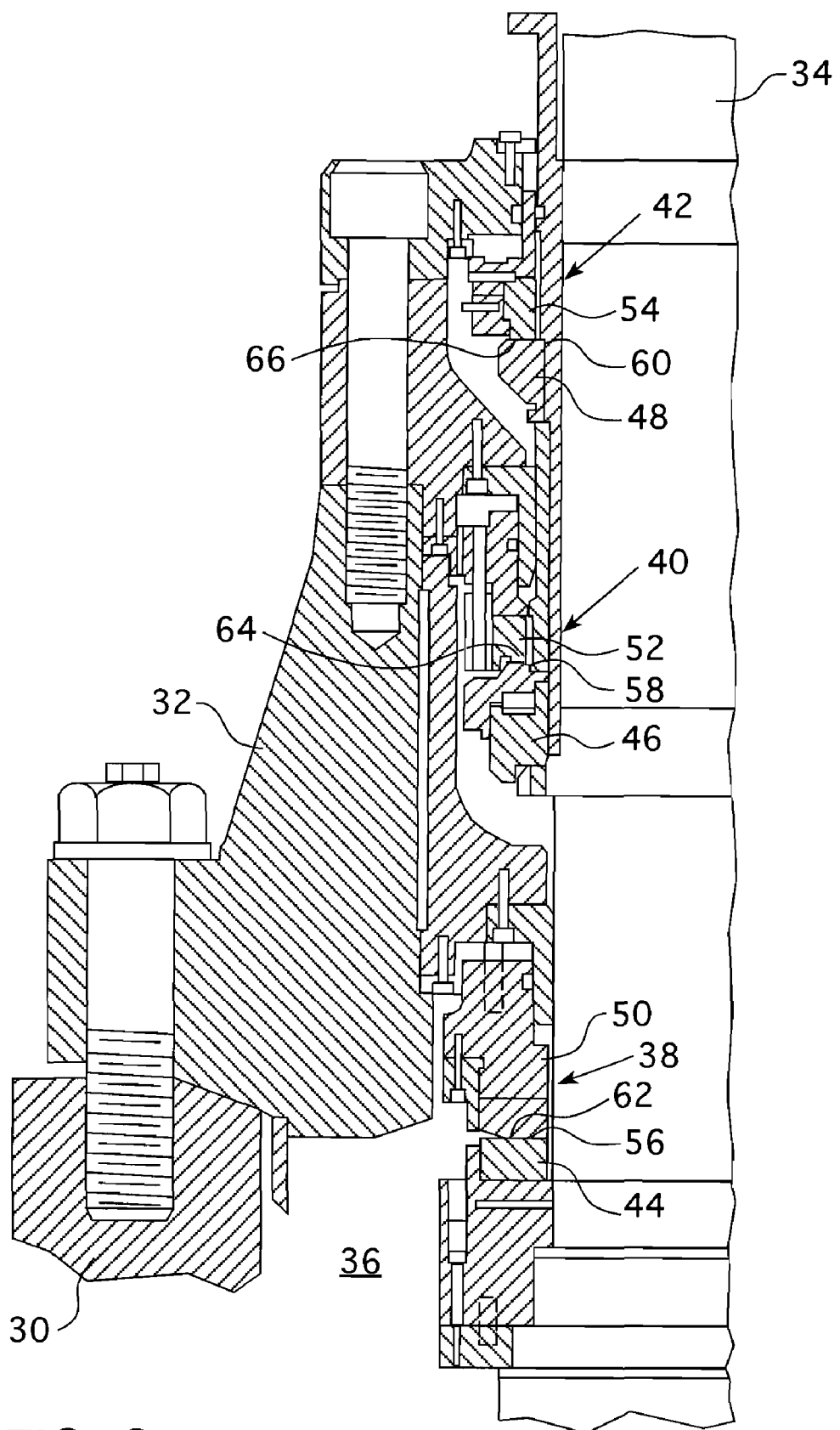
FIG. 3 is an enlarged cross sectional view of a portion of the seal housing and seal assemblies of the reactor coolant pump of FIG. 2.

As seen in FIGS. 2 and 3, the prior art reactor coolant pump 14 generally includes a pump housing 30 which terminates at one end in a seal housing 32. The pump also includes a pump shaft 34 extending centrally of the pump housing 30 and being sealed and rotatably mounted within the seal housing 32. Although not shown, the bottom portion of the pump shaft 34 is connected to an impeller, while a top portion thereof is connected to a high horsepower, induction type electric motor. When the motor rotates the shaft 34, the impeller within the interior 36 of the pump housing 30 causes the pressurized reactor coolant to flow through the reactor coolant system. This pressurized coolant applies an upwardly directed hydrostatic load upon the shaft 34 since the outer portion of the seal housing 32 is surrounded by the ambient atmosphere.

In order that the pump shaft 34 might rotate freely within the seal housing 32 while maintaining the 2,250 psia (155 bar) pressure boundary between the pump housing interior 36 and the outside of the seal housing 32, tandemly arrange lower primary, middle secondary and upper tertiary seal assemblies 38, 40, 42 are provided in the positions illustrated in FIGS. 2 and 3 about the pump shaft 34 within the seal housing 32. The lower primary seal assembly 38 which performs most of the pressure sealing (approximately 2,200 psi (152 bar)) is of the noncontacting hydrostatic type, whereas the middle secondary and upper tertiary seal assemblies 40, 42 are of the contacting or rubbing mechanical type.

Each of the seal assemblies 38, 40, 42 of the pump 14 generally includes a respective annular runner 44, 46, 48 which is mounted to the pump shaft 34 for rotation therewith and a respective annular seal ring 50, 52, 54 which is stationarily mounted within the seal housing 32. The respective runners 44, 46, 48 and seal rings 50, 52, 54 have top and bottom end surfaces 56, 58, 60 and 62, 64, 66 which face one another. The facing surfaces 56, 62 of the runner 44 and seal ring 50 of the lower primary sealing assembly 38 normally do not contact one another but instead a film of fluid normally flows between them. On the other hand, the facing surfaces 58, 64 and 60, 66 of the runners and seal rings 46, 52 and 48, 54 of the middle secondary and upper tertiary seal assemblies 40 and 42 normally contact or rub against one another.

Because the primary sealing assembly 38 normally operates in a film-riding mode, some provision must be made for handling cooling fluid which "leaks off" in the annular space between the seal housing 32 and the shaft 34 rotatably mounted thereto. Accordingly, the seal housing 32 includes a primary leakoff port 69, whereas leakoff ports 71 accommodate coolant fluid leakoff from the secondary and tertiary seal assemblies 40, 42.

Figure 4:
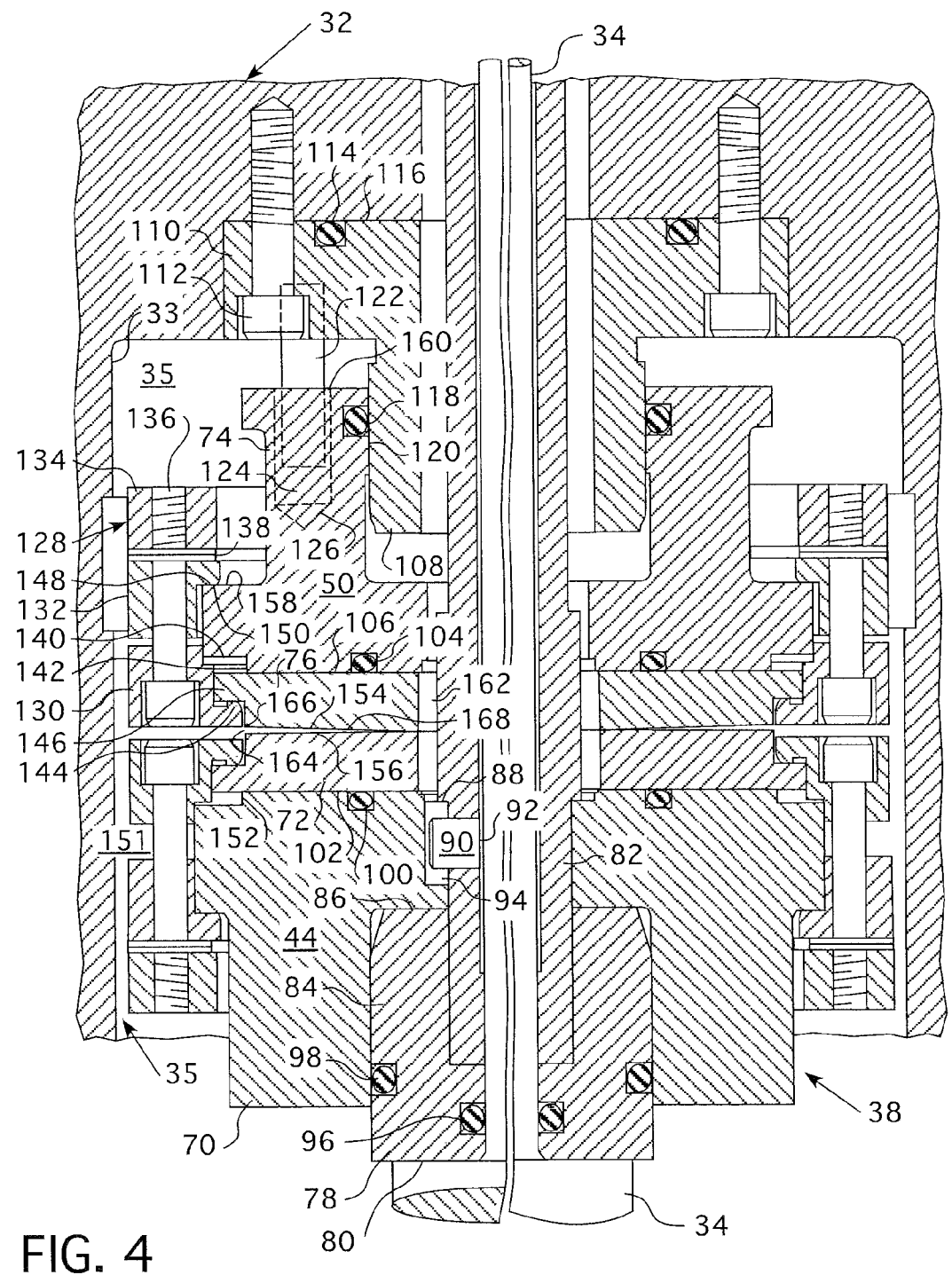
FIG. 4 is a sectional view of a shaft seal arrangement showing an enlarged view of the lower primary seal shown in FIGS. 2 and 3, to which this invention may be applied.

FIG. 4 is a cross section of the seal housing in the area of the number 1 or primary lower seal of the type illustrated in FIGS. 2 and 3 and provides a better understanding of the operation of the number 1 seal and how it will interface with this invention. The structure shown comprises a housing 32 having annular wall 33 adapted to form a pressure chamber 35 within the housing 32; a shaft 34 rotatably mounted within the housing 32; a seal runner assembly 44; and a seal ring assembly 50 disposed within the housing 32. As previously mentioned, the shaft 34 may be driven by a suitable motor (not shown) and utilized to drive the impeller of a centrifugal pump (not shown) which circulates the coolant fluid in the pressurized system. Injection water may be supplied to the chamber 35 at a higher pressure than that developed by the pump. The runner assembly 44 comprises an annular holder 70 and an annular seal plate 72. Similarly, the seal ring assembly 50 comprises a holder 74 and an annular face plate 76.

The holder 70 rotates with the shaft 34 since it is mounted on an annular support 78 which engages a shoulder 80 on the shaft 34 and is secured to the shaft by means of a sleeve 82 which is assembled onto the shaft 34 between the shaft and an upwardly extending leg 84 of the support 78 which is generally L-shaped in cross-section. It should be appreciated that although the invention is being described as applied to a pump that employs a sleeve over the pump shaft, the invention can be employed equally as well on pump shafts that do not employ sleeves. A shoulder 86 on the holder 70 rests on the upper end of the leg 84, and a shoulder 88 on the sleeve 82 retains the holder 70 on the support 78. A pin 90 is pressed into a recess 92 in the sleeve 82 and engages an axial slot 94 in the holder 70. An axial clamping force is exerted on the sleeve 82 and the support 78 from a nut (not shown) which causes the sleeve 82 and the support 78 to rotate with the shaft 34. The pin 90, in turn, causes the holder 70 to rotate with the sleeve 82 which rotates with the shaft 34. O-ring seals 96 and 98 are provided between the support 78 and the shaft 34 and the holder 70, respectively. An O-ring seal 100 is also provided in the interface 102 between the holder 70 and the face plate 72.

The face plate 72 is composed of a corrosion and erosion resistant material having substantially the same coefficient of thermal expansion as the material of which the holder 70 is composed, and the holder 70 has a high elastic modulus. Similarly, the face plate 76 is composed of a corrosion and erosion resistant material having substantially the same co-efficient of thermal expansion as the material of the holder 74 which has a high elastic modulus. Examples of suitable materials are carbides and ceramics. An O-ring seal 104 is provided in the interface 106 between the holder 74 and the face plate 26.

The holder 74 is movably mounted on a downwardly extending leg 108 of an annular seal ring insert 110 which is generally L-shaped in cross-section. The insert 110 is retained in the housing 32 by cap screws 112. An O-ring seal 114 is provided in the interface between the insert 110 and the housing 32. Similarly, an O-ring seal 118 is provided in the interface 120 between the holder 74 and the leg 108 of the insert 110. Rotative movement of the holder 74 is prevented by the pin 122 which is pressed into the insert 110. The pin 122 extends into a well 124 in the holder 74 with sufficient clearance between the wall of the well 126 and the pin 122 to permit axial movement of the holder 74 but limit rotative movement of the holder 74.

The face plate 76 is attached to the holder 74 by clamping means 128 which includes a retainer ring 130, a clamp ring 132, a lock ring 134, a plurality of cap screws 136, and Belleville springs 138 mounted on the cap screws 136 between the lock ring 134 and the clamp ring 132. The cap screws 136 extend through the retainer ring 130, the clamp ring 132, the Belleville springs 138 and are threaded into the lock rings 134. The interface 106 of the holder 74 is recessed at 140 to provide an annular fulcrum 142 on the interface at an outside diameter which is less than the outside diameter of the interface of the face plate 76. The retainer ring 130 has an inwardly extending flange with a ridge 144 which engages the portion 146 of the face plate 76 extending beyond the fulcrum 142. The clamp ring 132 has an inwardly extending flange with a ridge 148 which engages a face 150 on the holder 74. Thus, when the cap screws 136 are tightened to draw the clamp ring 132 and the retainer ring 130 towards each other, a force is produced which exerts a cantilever effect on the face plate 76 about the fulcrum 142. During the clamping action the Belleville springs 138 are partly compressed and the face plate 76 is deformed by the clamping force.

The face plate 72 is attached to the holder 70 by a clamping means 151 in a manner similar to that described with reference to the face plate 76. However, the fulcrum 152 on the interface 102 of the holder 70 is located closer to the outside diameter of the face plate 72 than is the fulcrum 142 on the holder 74. Thus, the clamping force on the face plate 72 does not produce as much deformation of the face plate about the fulcrum 152 as is produced on the face plate 76. If desired, the fulcrums 142 and 152 may be placed at the same locations with respect to their corresponding face plates.

As previously described, the seal ring assembly 50 is mounted for limited axial movement relative to the shaft 34 and the seal runner assembly 44. Also, rotative movement of the seal ring assembly 50 is limited by the anti-rotational pin 122 which fits loosely in the well 124 in the seal ring holder 74. A seal face 154 on the face plate 76 is biased toward the confronting seal face 156 on the face plate 72 by gravity.

In the operation of the pump driven by the shaft 34, surfaces 158 and 160 of the seal ring holder 74 are subjected to the full pressure in the high pressure chamber 35. It is desirable to provide a pressure barrier between the high pressure chamber 35 and an annular low pressure region 162 adjacent the sleeve 82. The seal ring assembly 50 is utilized as the pressure barrier means, but permits a controlled amount of fluid leakage flow to the region 162 from the pressure chamber 35 through a seal gap 164 provided between the confronting sealing surfaces 154 and 156 on the seal plates 76 and 72, respectively.

During operation, a balanced or equilibrium position of the axially movable seal ring assembly 50 is maintained in accordance with the pressure on opposing faces of the seal ring assembly. The thickness of the fluid in the gap 164 and, consequently, the amount of leakage flow through the gap 164 is determined by the configuration of the gap 164.

In order to obtain a self-restoration of the relative position of the seal ring assembly 50 and the runner assembly 44 upon a variation in the seal gap 164, a fluid flow path of decreasing thickness is provided from a high pressure edge or extremity 166 to a position between the seal faced extremities. More specifically, in the structure illustrated, the fluid flow path of decreasing thickness extends between the outer edge 166 and an intermediate concentric circle located at 168 on the sealing face 154.

As shown in the present structure, the decreasing flow path thickness is formed by tapering the surface 154 slightly away from the confronting surface 156 of the face plate 72 between the circle 168 and the outer edge 166 of the face plate 76. The angle between the surfaces 154 and 156 shown in the drawing is exaggerated. This configuration or structure is known as a tapered-face seal. The operation of a seal of this type is fully described in U.S. Pat. No. 3,347,552, issued Oct. 17, 1967 to Erling Frisch.

Shutdown Seal of the Present Invention

Figure 5:
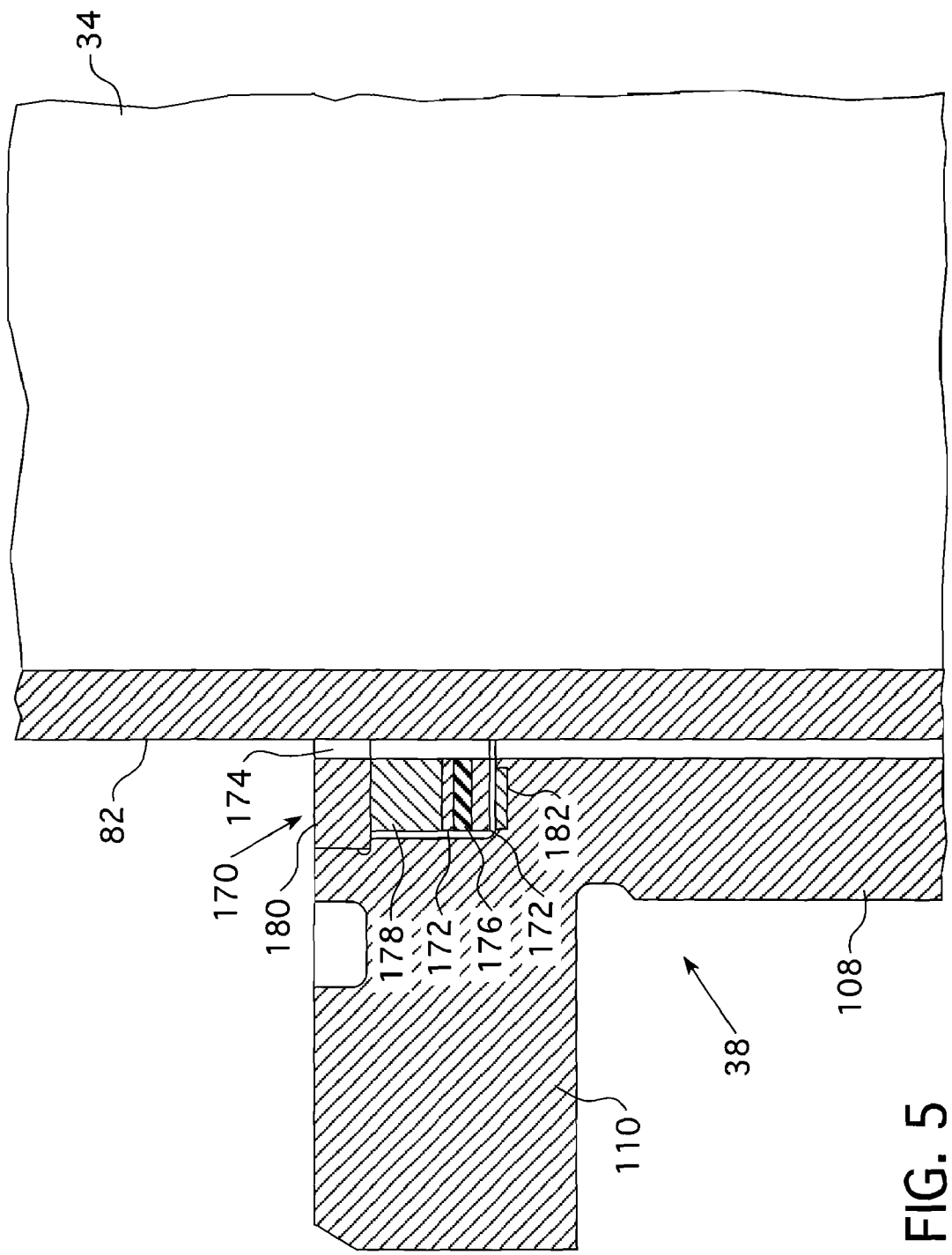
FIG. 5 is an enlarged portion of the insert of the primary seal shown in FIG. 4 with a portion of the pump shaft and shutdown seal of this invention hatched, wherein the shutdown seal employs a split ring spacer that is designed to decompose above normal operating temperatures.

In accordance with the present invention, as shown in FIGS. 5 and 7-9, an additional seal 170 is advantageously provided in the pump 14 as a backup safety or shutdown device which is actuatable to prevent excessive leakage along the shaft 34 between it and the seal assemblies 38, 40, 42 of the pump in the event of a loss of seal cooling. As shown in FIG. 5, the shutdown seal 170 is situated in a machined groove in the annular opening in the insert 110 of the primary number 1 seal 38. The shutdown seal is characterized by a "split ring" 172 that is designed (i) to surround the shaft 34 with an annulus 174 therebetween during normal operation and (ii) to constrict against the shaft 34 when the shaft significantly slows or stops rotating after a loss of seal cooling. The split ring 172 is a single piece discontinuous ring member that is split axially and the confronting ends are maintained in a spaced relationship by a spacer 176 during normal pump operation. In FIG. 5 the opposing ends of the split ring 172 are machined in a tongue and groove configuration so that the tongue can ride in the groove as the ends of the split ring overlap. In another embodiment the opposing ends may be butt-ended or have a mitered half-lap joint so the ends overlap. The spacer 176 is shown in the gap to keep the opposing ends of the split ring 172 from closing on the shaft 34 to maintain the annulus 174 open for controlled leakage during operation. In accordance with this invention the shutdown seal is activated when the temperature of the seal rises as a result of a loss of seal cooling and preferably rotation of the pump shaft is slowed or stopped. The spacer is responsive to the rise in temperature (either because the shaft has significantly slowed, or stopped rotating or for any other reason) to be removed from the confronting ends of the split ring 172. This causes the confronting ends of the split ring to constrict against the shaft 34 as the confronting ends of the split ring approach each other, which blocks the leakage of coolant through the flow annulus 174. Preferably the split ring and shaft (or shaft sleeve where a sleeve is employed over the shaft) are constructed from gall resistant materials, so that if actuated on a rotating shaft gall balls will not be created which would otherwise serve as a wedge to open a leak path between the sealing interface. Materials such as 17-4 stainless for both the split ring and the shaft have proven to work well. In one embodiment, the spacer is formed from a decomposable, e.g., meltable, material that is responsive to the rise in temperature to dissolve or significantly lose its compressive strength. In a second embodiment, the spacer is pulled from the split ring 172 by a passively actuated device. In either embodiment, a pliable polymer seal ring 178 is situated around the shaft 34 against the split ring 172 between the split ring and a solid retaining seat ring 180. The pliable polymer seal ring 178 is urged against the shaft by an increase in pressure in the housing when the split ring restricts the leakage of coolant through the annulus 174, thus forming a tight seal.

FIG. 5 depicts a shutdown seal 170 in accordance with the first embodiment of this invention installed in the reactor coolant pump of FIG. 4. The shutdown seal of FIG. 5 is designed to activate after a loss of seal cooling and seal leak-tight when the pump shaft 34 slows down or is not rotating. The shutdown seal is located within the pump housing, encircling the shaft 34. In the case of the type of reactor coolant pump illustrated in FIGS. 2-4, the #1 seal insert may be modified by machining out a portion of the inner diameter at the top flange. Until activated, the shutdown seal 170 is substantially completely contained within the space once taken up by the #1 insert prior to modification, thus substantially unaltering the annulus 174 between it and the shaft 34. In this way coolant flow through the annulus 174 along the shaft 34 is not substantially impeded during normal operation of the rotating equipment.

The activating portion of the shutdown seal 170 of FIG. 5 is made up of a low melting temperature spacer 176 holding the confronting ends of a split ring 172 open. For example, a Linear Low Density Polyethylene with a Melt Index of at least 25 g/10 min at 190° C. with 2.16 kg (using ASTM 01238 test) and with a glass transition point of 218° F. (103° C.) and melt temperature of 255° F. (124° C.) may be advantageously used in a reactor coolant pump. This polymer will ensure that shutdown seal 170 will not actuate during normal operation. When the spacer 176 softens, the split ring 172 begins to close, constricting around the shaft 34, while also remaining retained in the modified #1 seal insert. The pressure drop created across the seal by the split ring 172 interrupting the coolant flow through the annulus 174 results in the system pressure acting on the split ring 172 to seal even tighter until the spacer 176 is extruded from between the confronting ends of the split ring 172. With the spacer 176 gone, the split ring 172 can seal sufficiently to cause a primary sealing ring 178 to begin to seal. The split ring 172 sits on a wave spring 182 that forces the split ring 172 up against the primary sealing ring 178 to ensure an initial sealing contact so the pressure drop across the split ring 172 is also acting on the primary sealing ring 178. The wave spring, which is a resilient undulating strip of metal, maintains compressive force even when the shutdown seal actuates on a rotating shaft. The wave spring can rotate with the split ring or have the split ring rotate across its face without failing. The wave spring will provide sufficient spring force after the shaft comes to a stop to allow a tight seal to be established even if the split ring or polymer ring were worn. The primary sealing ring 178 is a solid ring of a pliable polymer material that, when acted upon by the very high pressure drop induced by the split ring 172, is constricted around the shaft 34 and upwards against a retaining ring 180. As the primary sealing ring 178 constricts; it creates a greater pressure drop which in turn further constricts the ring 178 tighter around the shaft 34 and upwards against the retaining ring 180. This pressure drop also pushes the split ring 172 and retaining ring 180 upwards, ensuring a tight seal between all the sealing surfaces. It has been established that preferably the inner diameter of the retaining ring 180 is approximately limited to that which forms a maximum of an 0.065 in. (0.17 cm.) extrusion gap between the retaining ring and the sleeve and a minimum of an 0.003 in. (0.008 cm.) extrusion gap based on a 8.47 in. (21.5 cm.) diameter sleeve using a PEEK polymer sealing ring 178 as hereafter described and limiting the pressure drop across the polymer ring to approximately 0.2 psia (0.014 bars). This minimum gap sets the smallest size foreign material that could pass through the seal. Desirably, the bottom of the retaining ring that interfaces with the shaft has a coefficient of friction of approximately 0.2 or less and preferably from 0.12 to 0.2.

An alternative design without the use of the polymer ring 178, using only the split ring 172 to seal against the shaft 34, yields a seal with less conformability and therefore greater leakage. The polymer ring 178 can conform to out-of-roundness, scratches, dents, debris, roughness, and other surface anomalies a split ring 172 could not form to. With the leak-tight seal provided by the polymer ring 178, there is no threat of wire-cutting from a leaking steam, which could eventually ruin the sealing surfaces and cause significant leakage. Another advantage of the polymer is its ability to slip along the shaft axially and shift with it radially and still maintain a tight seal. This is due to the low coefficient of friction and the fact it is a continuous ring. Once it initiates sealing, the split ring 172 is no longer required for the polymer ring 178 to seal.

The polymer ring 178 for the reactor coolant pump of FIGS. 2-4, is preferably formed from a PEEK (polyether-ether-ketone) polymer that will provide a leak-tight seal at reactor coolant pump pressures and temperatures provided the split ring can provide a minimum of 350 psi (24 bars) pressure drop at 300° F. PEEK has a glass-transition temperature of 300° F. (149° C.); the ideal actuation temperature to protect the reactor coolant pump seals from adverse conditions that not only may increase leak rate, but may damage the seals. Having a glass transition temperature of 300° F. (149° C.) means the polymer will be pliable enough to conform around the shaft yet still retain the strength to resist the shear forces trying to extrude it through the annulus. PEEK is also ideal in that its melt temperature is greater than 600° F. (316° C.), for example 647° F. (342° C.), assuring the seal will maintain integrity up to the maximum reactor coolant system temperature the seal will ever likely be exposed to (560° F. (293° C.)). Also, PEEK is not notably hydroscopic, so it will not swell and close the annulus during normal operation. PEEK will not cross-link to such a degree after 9-years worth of expected radiation to change its properties (glass transition temperature, melt temperature, or strength). With the narrow annulus in a reactor coolant pump seal between the shaft and the #1 insert, a 0.25 inch (6.35 mm) thick ring of PEEK can withstand the full reactor coolant system pressure of 2350 psi (162 bar) that could be seen across it, at 570° F. (299° C.), for at least 72 hours, and for at least an additional 44 hours at Residual Heat Removal conditions of 350° F. (177° C.) and 375 psi (26 bar). Because such a small amount of PEEK is required, the primary sealing ring 178 and the other two rings 172, 180 that make up the shutdown seal can fit in the volume permissible for removal from the #1 insert inside diameter without structural integrity issues for the #1 insert. Different fluids, temperatures, pressures, and clearances may require different polymers.

In the embodiment shown in FIG. 5, the split ring 172 has over-lapping ends with a mitered joint. A sufficient gap between the two ends is provided to allow the ends of the split ring 172 to slip along each other for the ring 172 to fit to slightly differing pump shaft diameters throughout the possible temperature ranges to which it will be exposed. Regardless of the profile chosen for the opposing ends of the split ring a sufficient gap should be provided between the directly opposing ends of the split ring so they do not touch each other when wrapped around the shaft at activation temperature. However, the gap should not be so large as to prevent a significant differential pressure from building when the spacer is removed. This gap must compensate for the differential heating of the split ring and shaft. Thus, the split ring 172 would not be sensitive to shaft tolerances or thermal expansion. Preferably, the inside diameter of the split ring 172 is within 0.001 inch (0.025 mm) of the diameter of the shaft to be sealed at the actuation temperature. The top, bottom and inner diameter surfaces of the split ring 172 have at least a 16 RMS surface finish wherein RMS is a measure of the roughness of the finish.

An advantage to using a PEEK polymer is that when the pressure is removed from the system after actuation, the PEEK polymer retracts from the shaft after as much as eight hours of leak-tight sealing and can be easily removed by technicians. Advantageously, the PEEK polymer does not require cutting or machining for removal, thereby eliminating foreign material residue concerns. If the polymer seals longer, it remains constricted, but is readily removed when lightly struck with a hammer.

Figure 6:
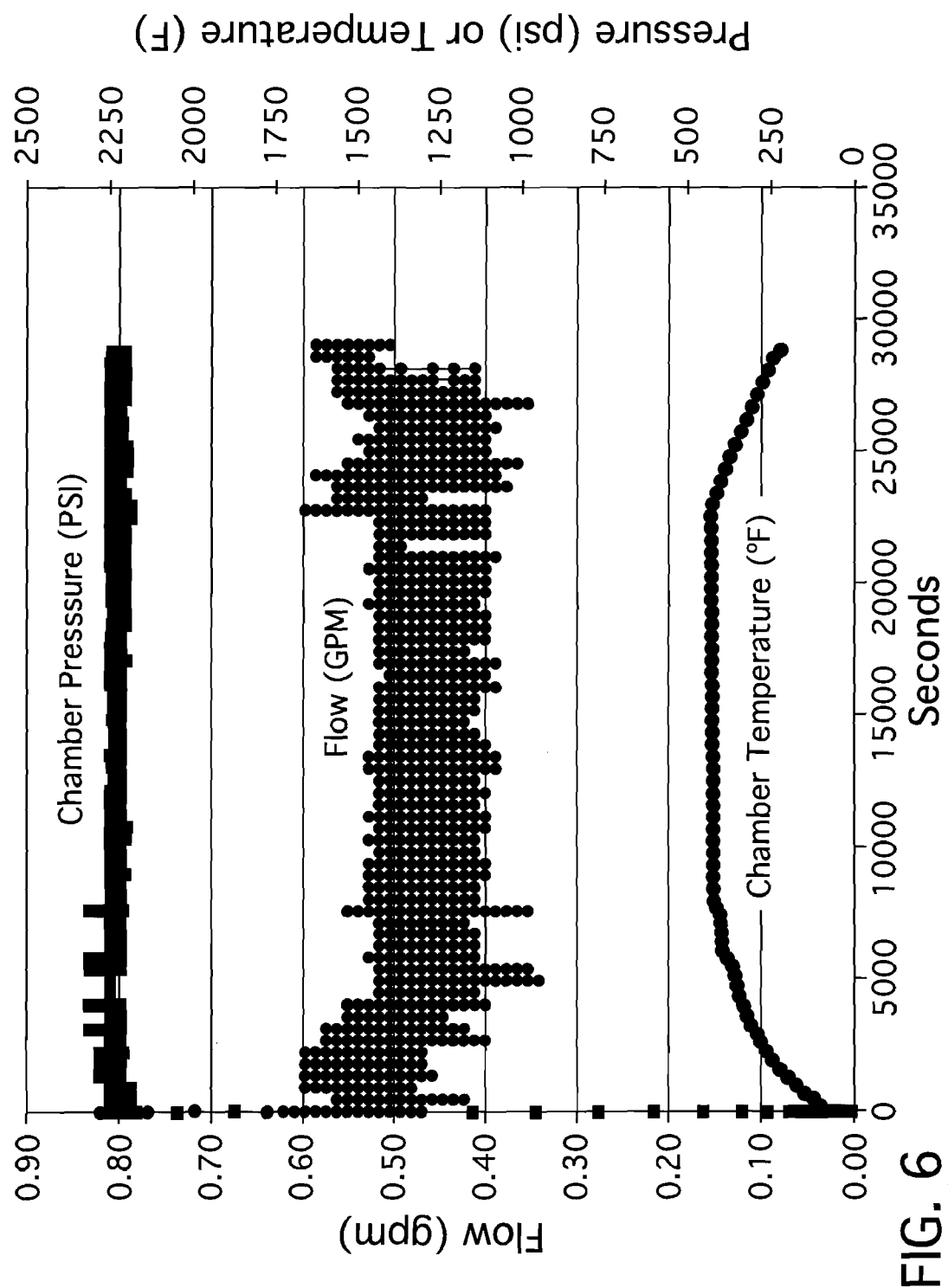
FIG. 6 is a graphical representation of data taken during a shutdown test of the shutdown seal of this invention in an environment simulating a pressurized water nuclear reactor.

The top of the retaining ring 180 may be coated with a PEEK polymer to assure a seal that is not sensitive to seal housing tolerances and surface conditions. The retaining ring 180 may be Type 410 stainless steel for a reactor coolant pump shutdown seal application. The shutdown seal components should have the same or similar thermal expansion coefficients as the #1 insert in which the retaining ring 180 is shrunk-fit (shrink-fitting assures all the rings and spring remain captured in the #1 insert). When the temperature rises to 560° F. (293° C.), with dissimilar thermal expansion coefficients, the retaining ring would deform and not uniformly support the PEEK ring 178, allowing it to possibly extrude, and fail. The top surface of the retaining ring 180 preferably has at least a 32 RMS surface finish and, after the shutdown seal is installed, is flush or even with the #1 insert flange annular surface. FIG. 6 depicts data taken during a shutdown test using a shutdown seal prototype of this invention in an environment simulating a pressurized water nuclear reactor.

Figure 7:
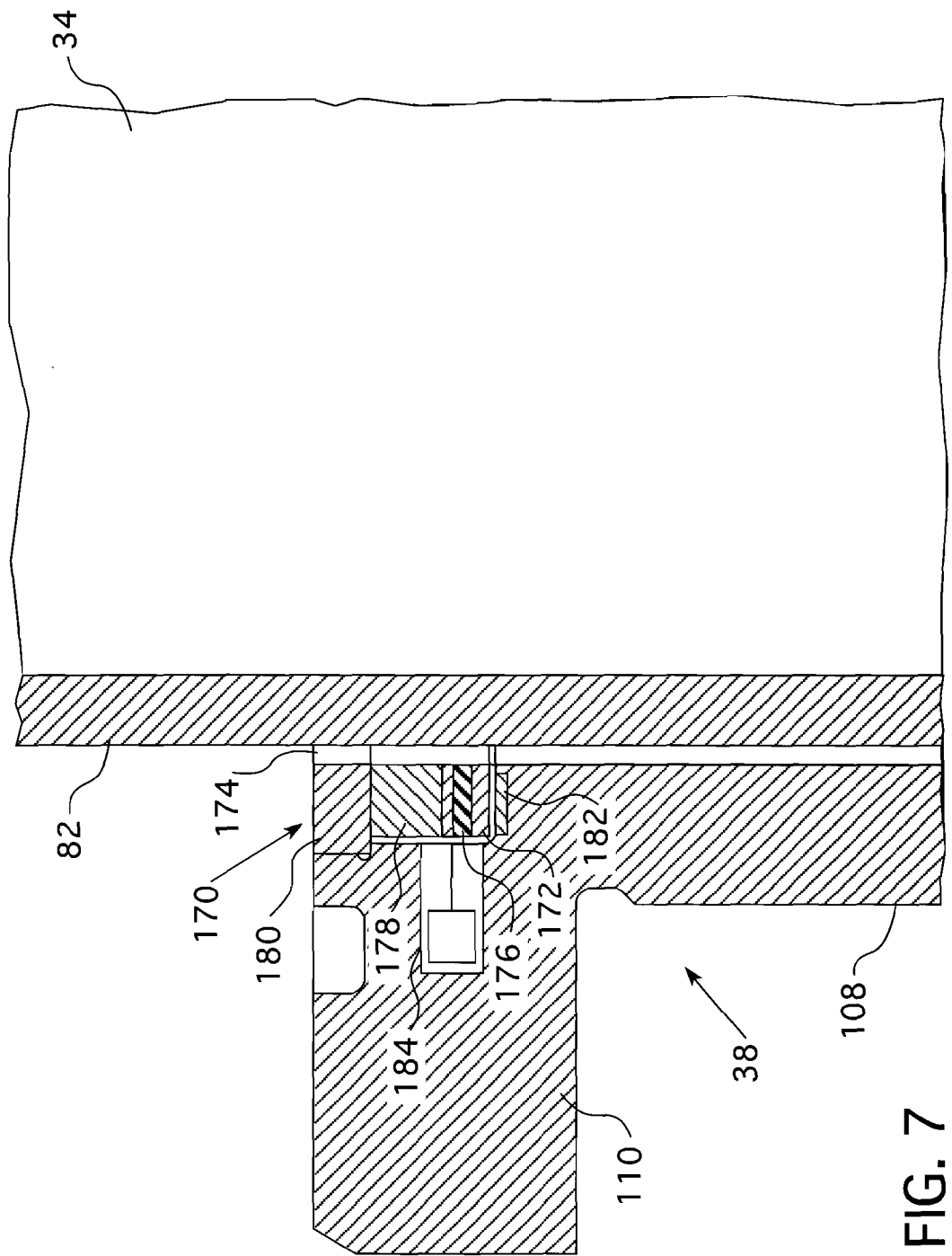
FIG. 7 is a view similar to that of FIG. 5 that employs a second embodiment of the shutdown seal of this invention that employs a thermally actuated mechanical piston to remove the spacer from the split ring.

FIG. 7 depicts a second preferred embodiment of the shutdown seal 170 of this invention that uses a thermally triggered piston to pull the spacer to a retracted position to close the split ring around the pump shaft. The shutdown seal of FIG. 7 is designed to activate after a loss of seal cooling and seal tight when the pump shaft 34 is slowing down or is not rotating. The shutdown seal is located within the pump housing, encircling the shaft 34. In the case of the type of reactor coolant pump illustrated in FIGS. 2-4, the #1 seal insert 110 may be modified by machining out a portion of the inner diameter at the top flange. Until activated, the shutdown seal 170 is completely contained within the space once taken up by the #1 insert prior to modification, thus unaltering the annulus 174 between the seal 170 and the shaft 34. Thus, coolant flow through the annulus along the shaft is not substantially impeded during normal operation of the rotating equipment.

The activating portion of the shutdown seal 170 of this preferred embodiment is made up of a retractable spacer 176 holding the confronting ends of a split ring 172 open. The retractable spacer 176 is activated by a thermally responsive mechanical device 184, such as the piston 186 described herein. When the spacer 176 is retracted from the ends of the split ring 172, the split ring 172 snaps shut, constricting around the shaft 34, while also remaining retained in the modified #1 seal insert 110. The split ring 172 sits on a wave spring 182 that forces the split ring 172 up against the seal ring 178 which pushes against the retaining ring 180. The pressure drop caused by the interruption of the flow through the annulus 174 also forces the split ring 172 and seal ring 178 upwards, ensuring a tight seal between all the sealing surfaces.

Figure 8:
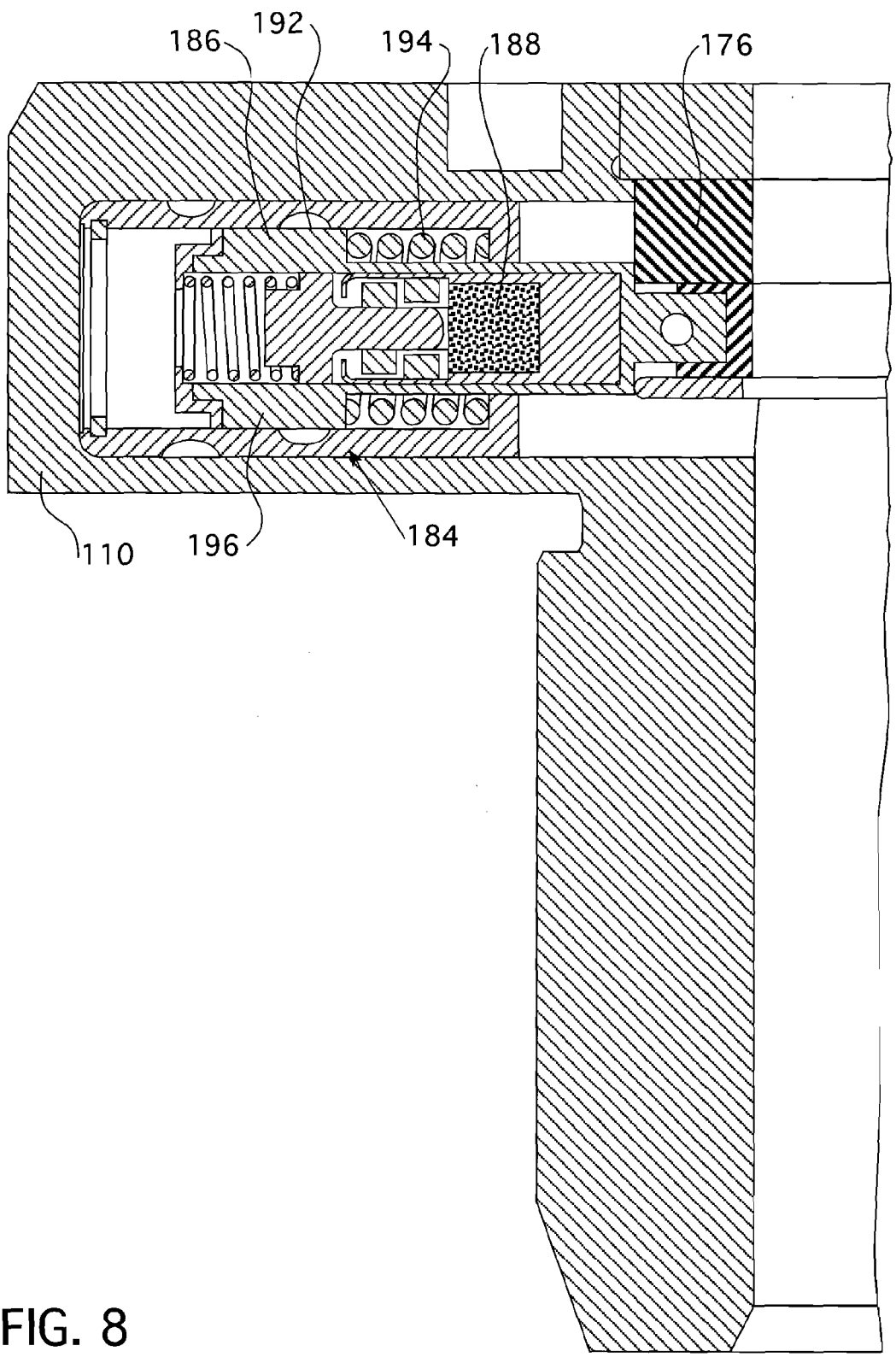
FIG. 8 is an enlarged view of the piston arrangement shown schematically in FIG. 7 with the piston in the fully extended position with the spacer inserted between the open ends of the split ring of this invention.

With the narrow annulus 174 in a reactor coolant pump seal between the shaft 34 and the #1 insert 110, a 0.25 inch (6.35 mm) thick split ring 172 can withstand the full reactor coolant system pressure of 2350 psi (162 bar) that could be experienced across it, at 552° F. (289° C.), and at 570° F. (299° C.), for at least 28 hours and for at least an additional 44 hours at Residual Heat Removal conditions of 350° F. (177° C.) and 375 psi (26 bar). Because such a small split ring 172 is sufficient, the split ring 172, the seal ring 178 and the retaining ring 180 that make up the shutdown seal 170 can fit in the volume permissible for removal from the #1 insert inside diameter without structural integrity issues for the #1 insert 110. The retractable spacer 176 is retracted from the ends of the split ring 172 by a thermally responsive mechanical device (or actuator) 184. FIGS. 7 and 8 depict the relative positions of the spacer 176 and actuator 184 during normal operation. The axis of the actuator 184 preferably is perpendicularly located relative to that of the shaft 34 and is recessed into the pump housing. For a reactor coolant pump, the actuator 184 is located in a bore made in the flange of #1 insert 110 wherein a portion of the inside diameter has been removed for the shutdown sealing rings.

Figure 9:
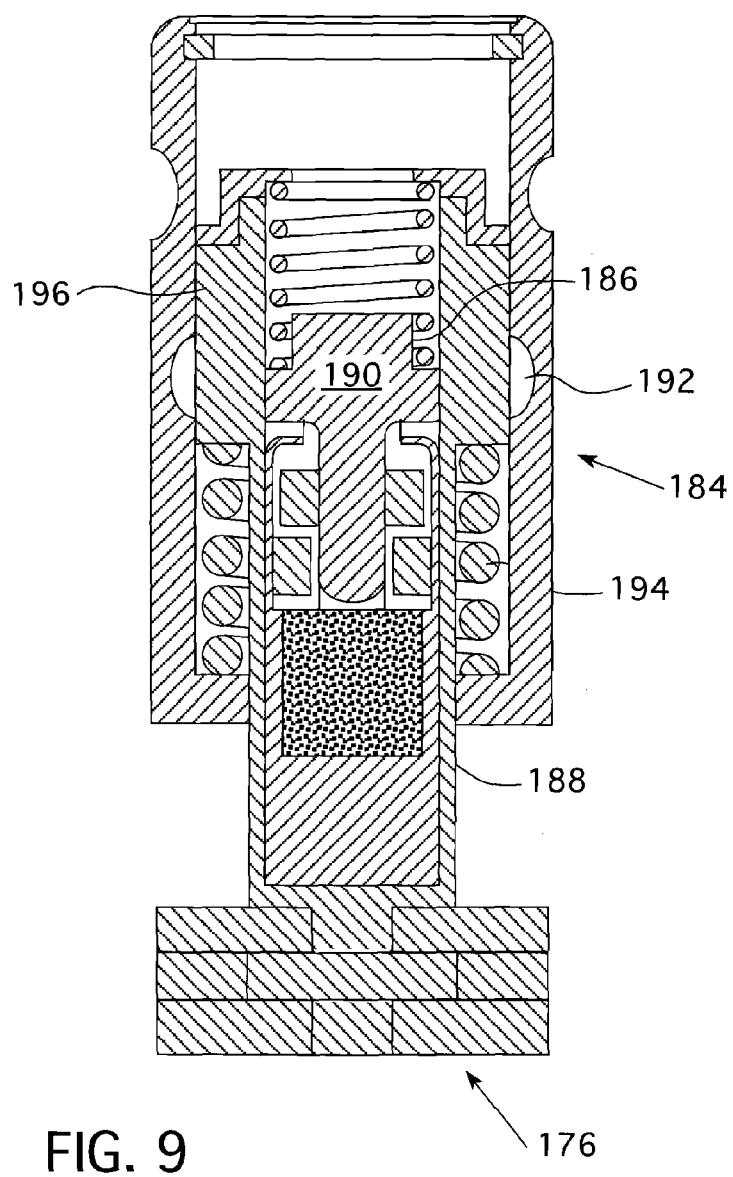
FIG. 9 is a sectional view that shows the piston arrangement of FIG. 8 before an actuation event in which the spacer is removed from between the open ends of the split ring.

FIG. 9 depicts the spacer 176 and actuator 184 assembly before an actuation event. The actuator 184, as shown in FIGS. 7, 8 and 9, is comprised of a canned piston 186 for restraining a spring-loaded spacer 176. Within the can is a wax 188 that changes phase at the desired activation temperature, e.g., 280° F. (138° C.) for reactor coolant pumps, as further explained herein. This change in phase results in a substantial increase in volume of the wax 188. For example, a wax such as octacosane will increase about 17% in volume. When the wax 188 changes phase and expands, it pushes a piston head 190 away from the pump shaft 34. When the piston head 190 moves, balls 192, that were once held in place by the head 190, will drop out of the way and allow a compressed spring 194 to expand which pushes back the plunger 196 that is connected to the spacer 176. As the spring 194 expands it pushes the plunger 196 which pulls the spacer 176 with it, thus retracting the spacer 176 from between the split ring ends. Spacer 176 may be coated with chrome-carbide to assure corrosion products do not increase the friction force that the spring 194 must overcome to retract spacer 176 from the split ring 172. The thermal actuator wax 188 may be formulated to change state at 265-280° F. (129-138° C.) to activate the shutdown seal. Above 282° F. (139° C.), the reactor coolant pump seal experiences mixed flow (steam and water) which may be very unstable and unpredictable. The alarm temperature for the seal leak off is 180-190° F. (82-88° C.) and the shutdown temperature is 225-235° F. (107-113° C.). Using an activation temperature between 260-280° F. (127-138° C.), the maximum amount of margin is provided, while protecting against potentially unstable conditions.

The shutdown seal design, though designed to seal leak-tight on a stopped shaft, is also capable of sealing leak-tight at a rotational speed of 20 rpm for a period of time exceeding that period which is required for the shaft to come to a rest, even with a completely non-sealing No. 1 Seal (the consequence of a non-sealing No. 1 Seal is discussed hereafter). Twenty RPM is the approximate speed where the oil wedge in the reactor coolant pump motor bearing breaks down which causes the shaft of the reactor coolant pump to come to an immediate stop. It is in this speed range where the shaft rotates the longest due to the asymptotic deceleration of the reactor coolant pump while the motor bearing provides very low frictional resistance. The torque applied to the shaft by the shutdown seal is sufficient to bring a reactor coolant pump to rest well before significant damage to the shutdown seal causes the leak-tight seal to be broken.

This shutdown seal design is also capable of controlling leakage at an average rate of 1 gpm (3.785 lpm) when actuated on a shaft rotating at 50 RPM. Fifty RPM is the approximate speed at which the shaft will be rotating if the reactor coolant pump motor is tripped one minute too late. The shutdown seal can withstand this rotation for a period of time exceeding that which would be required for the shaft to come to rest, even with a completely non-sealing No. 1 Seal. Thus the shutdown seal design provides margin for the operator to react to a loss of all seal cooling event.

Although optimized to seal (leak-tight) on a stationary shaft, several of the components of the shutdown seal in conjunction with the reactor coolant pump No. 1 Seal have properties that favor the shutdown seal sealing when it should and not sealing when it should not. Not only will it seal, it will not disrupt reactor coolant pump sealing, or damage components. These properties allow the shutdown seal to endure activating on a shaft rotating as fast as full-speed and enduring for a period of time long enough for the plant operator to take action to safely bring the reactor coolant pump to a stop. In some circumstances the shutdown seal can endure sealing on a full-speed shaft indefinitely such that the reactor coolant pump or plant does not require being shutdown at all. When the shaft does come to a rest in these circumstances, the shutdown seal has proven to be capable of sealing, i.e., <1 gpm, a in loss of all seal cooling event.

The shutdown seal design takes advantage of the No. 1 Seal properties that not only protect the shutdown seal from being damaged, but urges it to seal in a loss of all seal cooling event. The protective property of the No. 1 Seal is a result of the convergent taper angles on its faceplate which render the Seal leakoff insensitive to differential pressure. As such, it is capable of pressure-sharing with an inadvertently actuated shutdown seal while remaining in its normal operating range. The shutdown seal must induce 80% of the system differential pressure before the performance of the No. 1 Seal would degrade to such a point as to require the reactor coolant pump to be tripped.

Even if a shutdown seal were able to develop 100% of the system differential pressure across it, the No. 1 Seal is capable of withstanding the momentary rub of its faceplate. With 100% of the system differential pressure across the shutdown seal, the No. 1 Seal must only contend with its own weight providing the contact force. Even in this most extreme case where the No. 1 Seal does not provide any sealing, the shutdown seal can only provide this amount of differential pressure for approximately 12 seconds, after which it wears away to the point that it will release enough from the shaft to begin pressure-sharing—which limits the available pressure to cause further wear.

When the shutdown seal actuates on a rotating shaft, the damage is self-limited. The split ring can only wear the shaft to a point where its circumference is reduced to that of the split ring when its ends abut one another. The gap between the ends of the split ring is designed to allow for thermal expansion of the ring and not to allow the ends to abut. Thus, the gap is very small. The circumferential reduction is three times that of the reduction in the shaft diameter due to wear. The amount of wear to which the shaft is limited is nearly undetectable via human touch. This limit in wear is independent of RPM or the duration of the rotation.

Not only does the self-limiting wear protect the shaft and split ring from appreciable wear, it also protects the polymer ring and the other components. Once the maximum wear has occurred, the shutdown seal no longer seals well enough to induce the polymer ring to constrict around the shaft. Therefore its wear is arrested as well. With the No. 1 Seal regaining more and more of the differential pressure as the shutdown seal opens, lower and lower forces are present to cause the shutdown seal to wear.

The retaining ring is optimized to endure actuation on a full-speed rotating shaft and protect downstream components. For endurance its bottom surface is coated with a wear-resistant coating that is then surface-treated to reduce friction between it and the polymer ring. The retaining ring protects the downstream system and components by limiting the size of the wear particles able to pass through the annulus it forms with the shaft. Even if the shutdown seal were to catastrophically fail, debris would be contained in the area of the shutdown seal unless small, and therefore safe enough to pass.

Protecting the spring from wear is the fact that as the polymer ring wears, the spring is unloaded more and more. The lesser the load, the lesser the wear rate.

Not only will the shutdown seal not be severely damaged or damage the No. 1 Seal when it inadvertently actuates, the shutdown seal is likely to seal if the shaft is stopped in a loss of all seal cooling event. A loss of all seal cooling event brings with it temperatures upwards of 550° F. (288° C.). The shutdown seal design takes advantage of this and the accompanying effects the temperature has on the system. The response of the No. 1 Seal to the marked increase in temperature is to have its taper angles rollback which opens the seal and creates greater leakage. At 550° F. (288° C.), the No. 1 Seal leaks 22 gpm (83 lpm). The shutdown seal design takes advantage of this increase in flow and temperature in two ways. The increased flow generates a significantly larger differential pressure across the self-limited annulus between the split ring and shaft. This differential pressure then induces the polymer ring to seal. Further assisting the polymer ring to seal is the fact that as the temperature increases the mechanical properties of the polymer are reduced. So, as temperatures increases, less and less differential pressure is required to constrict the polymer ring, while more and more differential pressure is generated by the split ring. At 550° F. (288° C.) the annulus will create approximately 900 psid (6.21 MPad), while the polymer ring will only require 100 psid (689 kPad) to close.

Even when the entire polymer ring is worn away and the shaft is worn to its self-limited dimension, the shutdown seal still functions as a flow-limiting device in a loss of all seal cooling event. The tight annulus restricts the flow to less than that of the best-case scenario of the No. 1 Seal alone.

The polymer ring is self-protecting in as much as its physical properties are much greater below temperatures where the shutdown seal is designed to actuate. Thus, it resists constricting to the shaft at temperatures below the design temperature. This protects and preserves the polymer ring integrity until the design temperature is approached.

The split ring can be butt-ended rather than having a miter joint if the shaft is equipped with a removable sleeve on which the split ring will seal. If this sleeve diameter and surface finish are tightly controlled, then the simpler split ring design can be employed. This split ring, however, must be sized to allow for normal growth from room temperature to activation temperature. Too large of a ring diameter is just as likely to leak as one too small. Too large and the ends of the ring will abut and not allow the entire circumference to contact the sleeve. Too small and there will be a gap between the ends through which flow can escape without generating sufficient differential pressure to reduce flow or induce the polymer ring to constrict.

The closing force of the split ring must be controlled within two constraints. First, it must not be so strong as to prevent the spacer of the retracting actuator to be pulled from between the ends of the split ring. Second, the closing force must be great enough to provide sufficient contact around the shaft as to cause maximum differential pressure.

Contrary to typical response to increased temperature, PEEK in this application gains strength and crystallizes to resist being extruded through the annulus. This phenomenon is due to simultaneously applying substantial compressive stresses on the polymer ring via the very high differential pressure across the polymer ring, while also applying great thermal stress due to the large increase in temperature that is experienced at activation of the shutdown seal. The compression does not permit the primary seal ring 178 to strain radially as it normally would via thermal expansion. So, rather than expand, the thermal energy being added to the material results in molecular changes within the material.

As the polymer passes through its glass transition temperature the molecules attain the energy level required to rearrange themselves. This typically leads to the polymer becoming more amorphous and the properties, especially the tensile and flexural properties, start to drop. Compressive properties do not drop at the same rate, as the viscous nature of the material must be considered. Heating a constrained material generates internal stress if the material cannot strain. If it cannot strain then the energy must be "absorbed" by the molecular structure of the material in other ways. In the case of the polymer ring in the shutdown seal, due to so much energy being put into vibrating its molecular chain it moves into a "low energy," mutually supportive state. For a semi-crystalline polymeric material like PEEK the move into a mutually supportive state is to crystallize. This increases the molecular density of the material (from 1.26 g/cc to 1.35 g/cc). With chain scission occurring in the polymer as well, the extra molecular freedom assists in allowing more molecular realignment enabling the molecular structures to tessellate together and further crystallize.

The end result of this is that the mechanical properties of the PEEK ring increase substantially as the simultaneous pressure and temperature of the reactor cooling system are applied. In other words, initially the increase in temperature reduces the mechanical properties of the PEEK, allowing it to constrict and begin to seal. As the ring begins to seal, the compressive forces increase and combine with the thermal stresses. The resistance to extrusion quickly increases to such a point that any further extrusion is completely arrested. In the shutdown seal application, the volume of PEEK extruded into the annulus formed by the retaining ring in the shaft is limited to approximately 2% of the total ring volume. This is independent of duration of exposure to the 570° F. (299° C.) and 2350 psid (162 bar), beyond eight hours. At exposure times less than eight hours the ring is not permanently deformed. So, when the pressure and temperature are removed, the ring returns to its original dimensions and the No. 1 Seal leak path is restored (however the split ring remains constricted). However, at exposures of at least eight hours, the PEEK will irreversibly crystallize and have a slightly lower volume (~7% less). The ring therefore will "shrink" on its inner diameter, and will still be clamped tightly to the shaft/sleeve.

Figure 10:
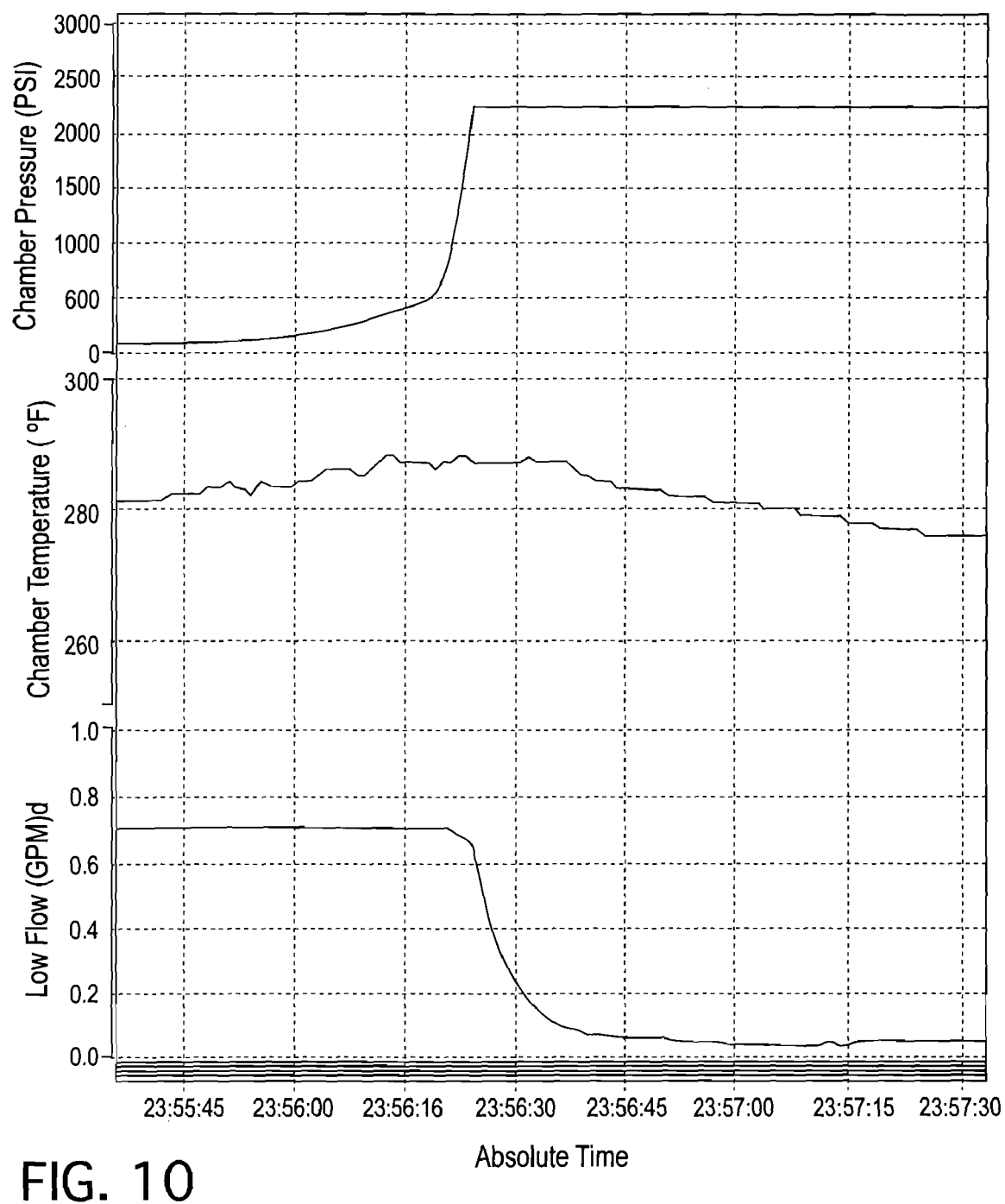
FIG. 10 is a graphical representation of data taken during a shutdown test using the shutdown seal of this invention in an environment simulating a pressurized water nuclear reactor, that shows that the shutdown seal effectively blocks coolant flow in less than about 45 seconds after the activation temperature was reached.

FIG. 10 depicts data taken during a shutdown test using a shutdown seal prototype of the preferred embodiment of this invention in an environment simulating a pressurized water nuclear reactor. FIG. 10 shows that the prototype seal effectively shuts down the coolant flow in less than about 45 seconds after the activation temperature was reached.

Figure 11:
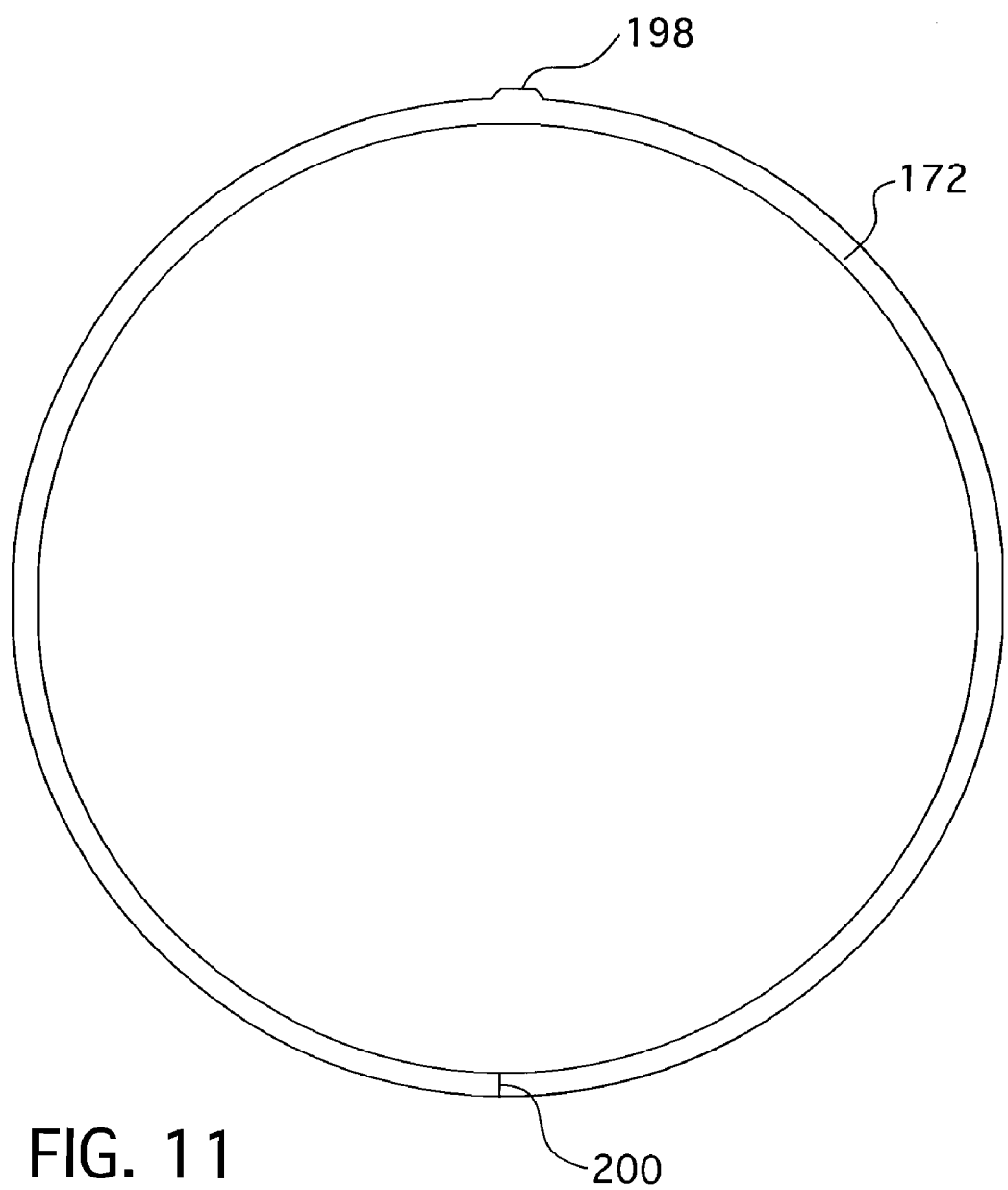
FIG. 11 is a plan view of an improved split ring for the shutdown seal of this invention.

FIG. 11 illustrates another improvement to the split ring 172 of the shutdown seal of this invention to ensure the split ring does not protrude into the annulus 174 between the shaft 34 and the number one insert 110 while in the restrained open position. A short segment 198, e.g., between 2-5 and preferably 3 degrees of the circumference, of the split ring 172 is stiffened 180 degrees opposed to the split ring opening 200. Without the wider radial segment 198, the split ring expands preferentially 90 degrees to the gap 200 which distorts it into an egg-shape when concentrated 180 degrees away from the opening 200. By stiffening the region 198 the stresses are more equally distributed and a more circular inner diameter is formed. In this way, the inner diameter of the spit ring 172 better fits the shape of the inner diameter of the of the number 1 insert 110 with which it must remain concentric in order to avoid disturbing the flow steam in the annulus 174.

Accordingly, these embodiments are designed to seal a reactor coolant pump in the event of a loss of all seal cooling caused, for example, by a station blackout due to, e.g., loss of all A/C Power. These shutdown seals will meet the requirements of the US Nuclear Regulatory Commission's station blackout requirements (protect the core for a mandatory coping period of 4-8 hours), its Appendix R requirements (assure adequate coolant volume to maintain pressurizer control to bring the plant to cold shutdown within 72 hours during a fire), and National Fire Protection Association Standard 805 regulations (prevent the seals from leaking 183 gpm (693 lpm) at 550° F. (288° C.)). Also, the shutdown seal will significantly improve the Mitigating Systems Performance Index margins for utilities.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A shutdown seal for surrounding a rotating shaft and preventing a fluid in an annulus surrounding the shaft from leaking past the shutdown seal after the rotation of the shaft has slowed or is not rotating, comprising:
   a constrictable split ring surrounding the shaft, the split ring having confronting ends and an inner diameter spaced from the shaft when the shaft is rotating, the inner diameter defining a portion of the annulus;
   a spacer disposed between the confronting ends of the split ring for maintaining the annular space between the confronting ends during normal operation of the shaft, the spacer is operable to be removed from between the confronting ends when the liquid rises above a pre-selected temperature so the split ring can constrict to narrow or substantially seal a portion of the annulus;
   a generally rigid retaining ring encircling and spaced along the shaft upstream, in a direction of flow of the liquid, from the split ring, the retaining ring having an inner diameter spaced from the shaft when the shaft is rotating, the inner diameter defining a portion of the annulus; and
   a pliable polymer ring surrounding the shaft and positioned between the split ring and the retaining ring, the polymer ring having an inner diameter spaced from the shaft when the shaft is rotating, the inner diameter defining a portion of the annulus, the pliable polymer ring being urged toward the shaft by a pressure differential across the polymer ring when the split ring is constricted and moves into the annulus towards the shaft.

2. The shutdown seal of claim 1 wherein the polymer ring has a glass transition temperature close to the pre-selected temperature.

3. The shutdown seal of claim 2 wherein the polymer is a PEEK polymer.

4. The shutdown seal of claim 1 wherein the preselected temperature is approximately 300 degrees Fahrenheit (149 degrees Celsius) or higher.

5. The shutdown seal of claim 1 wherein the spacer comprises a Linear Low Density Polyethylene with a Melt Index of at least 25 g/10 min at 190 degrees Celsius with 2.16 kg and with a glass transition point of approximately 218 degrees Fahrenheit and a melt temperature of approximately 255 degrees Fahrenheit.

6. The shutdown seal of claim 1 including a spring positioned to bias the split ring against the pliable polymer ring substantially in a direction of an axis of the shaft.

7. The shutdown seal of claim 6 wherein the spring is a wave spring.

8. The shutdown seal of claim 1 wherein the polymer ring is a solid continuous ring.

9. The shutdown seal of claim 1 wherein the polymer ring is approximately 0.25 inches thick.

10. The shutdown seal of claim 1 wherein the inner diameter of the split ring is within 0.001 inch of a diameter of the shaft.

11. The shutdown seal of claim 1 including a thermally responsive actuator attached to the spacer, that is responsive to a rise in temperature of the liquid within the annulus to or above the preselected temperature to pull the spacer from between the confronting ends of the split ring.

12. The shutdown seal of claim 11 wherein the thermally responsive actuator is a piston moveable within a cylinder, that is responsive to a change of state of a material within the cylinder, at the preselected temperature, to move in a direction to pull the spacer from between the confronting ends of the split ring.

13. The shutdown seal of claim 12 wherein the material is a wax.

14. The shutdown seal of claim 13 wherein the wax is octacosane.

15. The shutdown seal of claim 1 wherein the retaining ring is at least partially coated with a polymer.

16. The shutdown seal of claim 1 wherein the spit ring has a radially thickened circumferential portion approximately 180 degrees from the confronting ends of the split ring.

17. The shutdown seal of claim 1 wherein either the split ring or the shaft is constructed from 17-4 stainless steel.

18. The shutdown seal of claim 1 wherein the inner diameter of the retaining ring forms an extrusion gap between the retaining ring and the shaft of approximately between 0.003 in. (0.008 cm.) and 0.065 in. (0.17 cm.).

19. The shutdown seal of claim 18 wherein the pressure drop across the pliable polymer ring is less than or equal to approximately 0.2 psia (0.014 bars).

20. The shutdown seal of claim 1 wherein the bottom of the retaining ring that interfaces with the shaft has a coefficient of friction of approximately 0.2 or less.

21. A pump having an impeller section which is connected to a motor through a shaft that is rotatably supported between the motor and the impeller with a seal housing interposed around the shaft between the motor and the impeller section, the seal housing having a shutdown seal for surrounding the rotating shaft and preventing a fluid in an annulus surrounding the shaft from leaking past the shutdown seal after rotation of the shaft has slowed or stopped, comprising: a constrictable split ring surrounding the shaft, the split ring having confronting ends and an inner diameter spaced from the shaft when the shaft is rotating, the inner diameter defining a portion of the annulus;
   a spacer disposed between the confronting ends of the split ring for maintaining the annular space between the confronting ends during normal operation of the shaft, the spacer is operable to be removed from between the confronting ends when the liquid rises above a pre-selected temperature so the split ring can constrict to narrow or substantially seal a portion of the annulus;

a generally rigid retaining ring encircling and spaced along the shaft upstream, in a direction of flow of the liquid, from the split ring, the retaining ring having an inner diameter spaced from the shaft when the shaft is rotating, the inner diameter defining a portion of the annulus; and a pliable polymer ring surrounding the shaft and positioned between the split ring and the retaining ring, the polymer ring having an inner diameter spaced from the shaft when the shaft is rotating, the inner diameter defining a portion of the annulus, the pliable polymer ring being urged toward the shaft by a pressure differential across the polymer ring when the split ring is constricted and moves into the annulus towards the shaft.

* * * * *